US008942112B2

(12) United States Patent
Andreasen et al.

(10) Patent No.: US 8,942,112 B2
(45) Date of Patent: Jan. 27, 2015

(54) SYSTEM AND METHOD FOR PROVIDING SELECTIVE MOBILITY INVOCATION IN A NETWORK ENVIRONMENT

(75) Inventors: Flemming S. Andreasen, Marlboro, NJ (US); Frank Brockners, Köln (DE); Vojislav Vucetic, Holmdel, NJ (US)

(73) Assignee: Cisco Technology, Inc., San Jose, CA (US)

( * ) Notice: Subject to any disclaimer, the term of this patent is extended or adjusted under 35 U.S.C. 154(b) by 496 days.

(21) Appl. No.: 12/371,511

(22) Filed: Feb. 13, 2009

(65) Prior Publication Data

US 2009/0207823 A1    Aug. 20, 2009

Related U.S. Application Data

(60) Provisional application No. 61/029,177, filed on Feb. 15, 2008.

(51) Int. Cl.
| H04L 12/26 | (2006.01) |
| H04W 4/24 | (2009.01) |
| H04L 12/14 | (2006.01) |
| H04L 12/801 | (2013.01) |
| H04L 12/813 | (2013.01) |
| H04L 29/06 | (2006.01) |

(52) U.S. Cl.
CPC ............ *H04W 4/24* (2013.01); *H04L 12/1403* (2013.01); *H04L 47/14* (2013.01); *H04L 47/20* (2013.01); *H04L 65/1016* (2013.01)
USPC ............................ 370/252; 370/329; 370/338

(58) Field of Classification Search
CPC ..... H04W 84/12; H04W 80/04; H04W 84/18; H04W 88/06; H04W 74/08
USPC .................... 370/249; 709/220, 227; 455/461
See application file for complete search history.

(56) References Cited

U.S. PATENT DOCUMENTS

| 6,304,567 | B1 | 10/2001 | Rosenberg |
| 6,587,882 | B1 * | 7/2003 | Inoue et al. .................... 709/227 |
| 6,603,761 | B1 * | 8/2003 | Wang et al. .................... 370/352 |
| 6,910,074 | B1 * | 6/2005 | Amin et al. .................... 709/227 |
| 6,934,274 | B2 * | 8/2005 | Inoue et al. .................... 370/338 |
| 6,937,597 | B1 | 8/2005 | Rosenberg et al. |
| 6,970,909 | B2 | 11/2005 | Schulzrinne |

(Continued)

OTHER PUBLICATIONS

Vakil, Sumit et al., "Diameter: IP Security Policy Extensions," Internet Draft draft-calhoun-diameter-ipsec-policy-00.txt, Mar. 1998, 35 pages; http://tools.ietf.org/pdf/draft-calhoun-diameter-ipsec-policy-00.pdf.

(Continued)

*Primary Examiner* — Steven H Nguyen
(74) *Attorney, Agent, or Firm* — Patent Capital Group

(57) ABSTRACT

A method is provided in one example embodiment and includes invoking a mobile access gateway function based on an end user requesting an Internet Protocol (IP) address in a wireless or a wireline network. The invocation is selective such that the mobile access gateway function is invoked if the end user requires IP mobility services. The method also includes communicating with a gateway in order to obtain the IP address. The mobile access gateway function is coupled to a network element that receives packets for a communications flow from the end user that can conduct the flow through the wireless network and through the wireline network.

21 Claims, 9 Drawing Sheets

(56) References Cited

U.S. PATENT DOCUMENTS

| | | | |
|---|---|---|---|
| 7,020,090 B2* | 3/2006 | Chandwadkar et al. | 370/249 |
| 7,079,499 B1 | 7/2006 | Akhtar et al. | |
| 7,170,863 B1 | 1/2007 | Denman et al. | |
| 7,170,887 B2 | 1/2007 | Rosenberg | |
| 7,548,756 B2 | 6/2009 | Velthuis et al. | |
| 7,606,191 B1 | 10/2009 | Breau et al. | |
| 7,710,923 B2 | 5/2010 | Carlton | |
| 7,831,701 B2 | 11/2010 | Hu | |
| 7,835,275 B1 | 11/2010 | Swan et al. | |
| 7,881,262 B2* | 2/2011 | Shousterman | 370/331 |
| 7,886,027 B2* | 2/2011 | Bolan et al. | 709/220 |
| 7,899,039 B2 | 3/2011 | Andreasen et al. | |
| 8,032,940 B1 | 10/2011 | Dhanani | |
| 8,036,191 B2* | 10/2011 | Kroselberg et al. | 370/338 |
| 8,150,366 B2 | 4/2012 | Noguchi et al. | |
| 8,195,778 B1 | 6/2012 | Leung et al. | |
| 8,223,635 B2 | 7/2012 | Song | |
| 8,379,519 B2 | 2/2013 | You et al. | |
| 2003/0091013 A1* | 5/2003 | Song et al. | 370/338 |
| 2003/0165145 A1 | 9/2003 | Cho | |
| 2004/0003241 A1 | 1/2004 | Sengodan et al. | |
| 2004/0008627 A1 | 1/2004 | Garg et al. | |
| 2004/0057458 A1 | 3/2004 | Kil et al. | |
| 2004/0077341 A1 | 4/2004 | Chandranmenon et al. | |
| 2004/0213260 A1* | 10/2004 | Leung et al. | 370/395.3 |
| 2004/0219905 A1 | 11/2004 | Blumenthal et al. | |
| 2004/0225895 A1 | 11/2004 | Mukherjee et al. | |
| 2005/0135375 A1 | 6/2005 | Hurtta et al. | |
| 2005/0159181 A1 | 7/2005 | Gadgil et al. | |
| 2005/0238002 A1 | 10/2005 | Rasanen | |
| 2005/0278532 A1 | 12/2005 | Fu et al. | |
| 2006/0041761 A1 | 2/2006 | Neumann et al. | |
| 2006/0063517 A1 | 3/2006 | Oh et al. | |
| 2006/0092963 A1 | 5/2006 | Bakre et al. | |
| 2006/0104308 A1 | 5/2006 | Pinkerton et al. | |
| 2006/0250956 A1 | 11/2006 | Alfano et al. | |
| 2006/0251043 A1 | 11/2006 | Madour et al. | |
| 2006/0251229 A1 | 11/2006 | Gorti et al. | |
| 2006/0268845 A1 | 11/2006 | He et al. | |
| 2006/0268901 A1 | 11/2006 | Choyi et al. | |
| 2007/0008900 A1* | 1/2007 | Shousterman | 370/252 |
| 2007/0127500 A1 | 6/2007 | Maeng | |
| 2007/0133574 A1 | 6/2007 | Tejani et al. | |
| 2007/0140255 A1 | 6/2007 | Gautier | |
| 2007/0160034 A1 | 7/2007 | Koretsky | |
| 2007/0189255 A1* | 8/2007 | Navali et al. | 370/338 |
| 2007/0202871 A1 | 8/2007 | Altshuller et al. | |
| 2007/0207818 A1* | 9/2007 | Rosenberg et al. | 455/461 |
| 2007/0266174 A1 | 11/2007 | Bestler | |
| 2007/0291733 A1 | 12/2007 | Doran et al. | |
| 2008/0026692 A1* | 1/2008 | Kojima | 455/7 |
| 2008/0046963 A1 | 2/2008 | Grayson et al. | |
| 2008/0046979 A1 | 2/2008 | Oulahal | |
| 2008/0049648 A1 | 2/2008 | Liu et al. | |
| 2008/0070619 A1 | 3/2008 | Yu | |
| 2008/0075114 A1 | 3/2008 | Mo | |
| 2008/0089251 A1 | 4/2008 | Gallego et al. | |
| 2008/0101291 A1* | 5/2008 | Jiang et al. | 370/331 |
| 2008/0127297 A1 | 5/2008 | Morris | |
| 2008/0137541 A1 | 6/2008 | Agarwal et al. | |
| 2008/0144615 A1 | 6/2008 | Casey | |
| 2008/0155677 A1 | 6/2008 | Hossain et al. | |
| 2008/0176582 A1 | 7/2008 | Ghai et al. | |
| 2008/0207206 A1 | 8/2008 | Taniuchi et al. | |
| 2008/0225806 A1 | 9/2008 | Arian et al. | |
| 2008/0229403 A1* | 9/2008 | Oswal et al. | 726/12 |
| 2008/0256237 A1 | 10/2008 | Liu | |
| 2008/0285492 A1 | 11/2008 | Vesterinen | |
| 2008/0307487 A1 | 12/2008 | Choyi et al. | |
| 2009/0016334 A1 | 1/2009 | Forsberg et al. | |
| 2009/0016364 A1 | 1/2009 | Krishnan | |
| 2009/0061869 A1* | 3/2009 | Bui et al. | 455/435.1 |
| 2009/0067417 A1 | 3/2009 | Kalavade et al. | |
| 2009/0198996 A1 | 8/2009 | Lie et al. | |
| 2009/0207759 A1 | 8/2009 | Andreasen et al. | |
| 2009/0207808 A1 | 8/2009 | McCann et al. | |
| 2009/0207823 A1 | 8/2009 | Andreasen et al. | |
| 2009/0219946 A1 | 9/2009 | Liu et al. | |
| 2009/0270064 A1 | 10/2009 | Kunniyur et al. | |
| 2010/0027509 A1 | 2/2010 | Velev et al. | |
| 2010/0061309 A1 | 3/2010 | Buddhikot et al. | |
| 2010/0071055 A1 | 3/2010 | Kaniz et al. | |
| 2010/0131621 A1 | 5/2010 | Zetterlund et al. | |
| 2010/0135279 A1 | 6/2010 | Petersson et al. | |
| 2010/0191829 A1 | 7/2010 | Cagenius | |
| 2010/0235620 A1 | 9/2010 | Nylander et al. | |
| 2010/0250753 A1 | 9/2010 | Song et al. | |
| 2010/0260105 A1 | 10/2010 | Keller et al. | |
| 2010/0272053 A1 | 10/2010 | You et al. | |
| 2010/0309846 A1 | 12/2010 | Rune | |
| 2011/0069673 A1 | 3/2011 | Oswal et al. | |
| 2011/0103266 A1 | 5/2011 | Andreasen et al. | |
| 2011/0214166 A1 | 9/2011 | Vinayakray | |
| 2012/0046037 A1 | 2/2012 | Diachina et al. | |

OTHER PUBLICATIONS

U.S. Appl. No. 12/642,797, filed Dec. 19, 2009, entitled "System and Method for Providing Mobility Across Access Technologies in a Network Environment," Inventor(s): Kent Leung, et al.

U.S. Appl. No. 12/771,574, filed Apr. 30, 2010, entitled "System and Method for Providing Selective Bearer Security in a Network Environment," Inventor(s): Flemming S. Andreasen.

USPTO Apr. 8, 2011 Final Office Action from U.S. Appl. No. 12/371,516.

USPTO Jul. 8, 2011 RCE Response to Apr. 8, 2011 Final Office Action from U.S. Appl. No. 12/371,516.

USPTO Jun. 9, 2011 Final Office Action from U.S. Appl. No. 12/371,524.

USPTO Sep. 9, 2011 RCE Response to Jun. 9, 2011 Final Office Action from U.S. Appl. No. 12/371,524.

USPTO Oct. 7, 2011 Non-Final Office Action from U.S. Appl. No. 12/642,797.

USPTO Jan. 30, 2014 Non-Final Office Action from U.S. Appl. No. 12/371,524.

USPTO Jan. 27, 2014 Final Rejection from U.S. Appl. No. 12/371,516.

USPTO Dec. 31, 2013 Non-Final Office Action from U.S. Appl. No. 12/771,574.

USPTO Dec. 8, 2013 Notice of Allowance from U.S. Appl. No. 12/987,311.

USPTO Jul. 5, 2012 Final Office Action from U.S. Appl. No. 12/371,524.

USPTO Jul. 11, 2012 Response to May 20, 2012 Non-Final Office Action from U.S. Appl. No. 12/371,516.

USPTO Aug. 1, 2013 Non-Final Rejection from U.S. Appl. No. 12/371,516.

USPTO Jun. 12, 2013 RCE Response to Mar. 20, 2013 Final Office Action from U.S. Appl. No. 12/771,574.

USPTO Sep. 12, 2013 Non-Final Office Action from U.S. Appl. No. 12/987,311.

USPTO Sep. 19, 2012 Response to Jun. 19, 2012 Non-Final Office Action from U.S. Appl. No. 12/771,574.

USPTO Oct. 4, 2012 RCE Response to Jul. 5, 2012 Final Office Action from U.S. Appl. No. 12/371,524.

USPTO Nov. 2, 2012 Final Rejection from U.S. Appl. No. 12/371,516.

USPTO Mar. 14, 2012 Response to Non-Final Office Action mailed Dec. 14, 2011 from U.S. Appl. No. 12/371,524.

USPTO May 10, 2012 Non-Final Office Action from U.S. Appl. No. 12/371,516.

USPTO Jun. 19, 2012 Non-Final Office Action from U.S. Appl. No. 12/771,574.

USPTO Apr. 16, 2012 Notice of Allowance from U.S. Appl. No. 12/642,797.

USPTO Dec. 14, 2011 Non-Final Office Action from U.S. Appl. No. 12/371,524.

(56) References Cited

OTHER PUBLICATIONS

USPTO Jan. 9, 2012 Response to Oct. 7, 2011 Non-Final Office Action from U.S. Appl. No. 12/642,797.
USPTO Feb. 4, 2013 RCE Response to Nov. 2, 2012 Final Rejection from U.S. Appl. No. 12/371,516.
USPTO Mar. 20, 2013 Final Office Action from U.S. Appl. No. 12/771,574.
USPTO Oct. 23, 2014 Non-Final Office Action from U.S. Appl. No. 12/771,574.

* cited by examiner

US 8,942,112 B2

SYSTEM AND METHOD FOR PROVIDING SELECTIVE MOBILITY INVOCATION IN A NETWORK ENVIRONMENT

CLAIMING PRIORITY ON A PROVISIONAL

This application claims priority under 35 U.S.C. §119 of provisional application Ser. No. 61/029,177, filed Feb. 15, 2008 and entitled System and Method for Providing Telecommunication and Internet Converged Services and Protocols for Advanced Networking.

TECHNICAL FIELD OF THE INVENTION

This invention relates in general to the field of communications and, more particularly, to providing selective mobility invocation in a network environment.

BACKGROUND OF THE INVENTION

Networking architectures have grown increasingly complex in communications environments. In addition, the augmentation of clients or end users wishing to communicate in a network environment has caused many networking configurations and systems to respond by adding elements to accommodate the increase in networking traffic. As the subscriber base of end users increases, proper routing and efficient management of communication sessions and data flows become even more critical.

As service providers increasingly move towards fixed-mobile convergence, there is a significant challenge in having a single architecture and associated infrastructure defined that can optimally support wireless and wireline networks.

BRIEF DESCRIPTION OF THE DRAWINGS

To provide a more complete understanding of example embodiments and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes invoking a mobile access gateway function based on an end user requesting an Internet Protocol (IP) address in a wireless or a wireline network. The invocation is selective such that the mobile access gateway function is invoked only if the end user requires IP mobility services. The method also includes communicating with a gateway in order to obtain the IP address. The mobile access gateway function is coupled to a network element that receives packets for a communications flow from the end user that can conduct the flow through the wireless network and through the wireline network.

Figure 1:
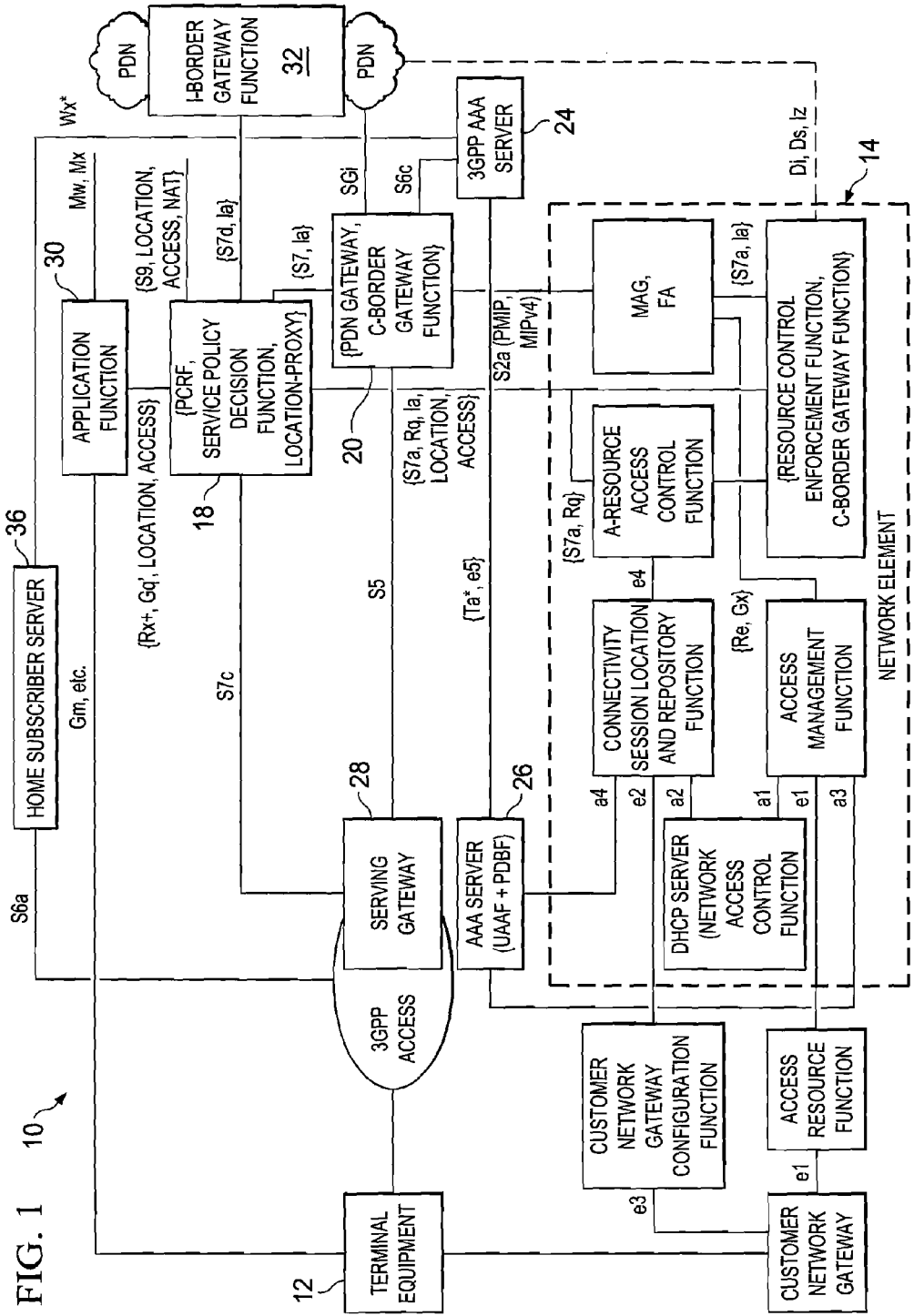
FIG. 1 is a simplified block diagram of a communication system in a network environment in accordance with one embodiment of the present invention.

Turning to FIG. 1, FIG. 1 is a simplified block diagram of a communication system 10 that can provide a unified way of supporting wireless and wireline networks. This particular configuration may be tied to the 3rd Generation Partnership Project (3GPP) Evolved Packet System architecture, but may also be applicable to other environments equally.

Note that before proceeding, it is important to identify some of the acronyms that may be used herein in this Specification. These include: Terminal Equipment (TE), Profile Database Function (PDBF), User Access Authentication Function (UAAF), Network Access Control Function (NACF), Customer Network Gateway (CNG), Connectivity Session Location and Repository Function (CSLRF), Access Management Function (AMF), Resource Control Enforcement Function (RCEF), Border Gateway Function (BGF), Interconnect-BGF (I-BGF), Core-BGF (C-BGF), Service Policy Decision Function (SPDF), Proxy Call Session Control Function (PCSCF), Serving Call Session Control Function (SCSCF), User Profile Serving Function (UPSF), Basic Transport Function (BTF), Packet Data Network (PDN), Authentication, Authorization, and Accounting (AAA), Application Function (AF), Home Subscriber Server (HSS), Mobile Access Gateway (MAG), and a Policy and Charging Rules Function (PCRF).

Each of the elements of FIG. 1 may couple to one another through simple interfaces (as illustrated) or through any other suitable connection (wired or wireless), which provides a viable pathway for network communications. Additionally, any one or more of these elements may be combined or removed from the architecture based on particular configuration needs.

Communication system 10 may include a configuration capable of transmission control protocol/internet protocol (TCP/IP) communications for the transmission or reception of packets in a network. Communication system 10 may also operate in conjunction with a user datagram protocol/IP (UDP/IP) or any other suitable protocol where appropriate and based on particular needs.

The example architecture of FIG. 1 includes a TE element 12, a network element 14, a PCRF 18, a PDN gateway 20, a 3GPP AAA server 24, a AAA server 26, a serving gateway 28, an AF 30, an interconnect-BGF 32 [I-BGF], and an HSS 36. Note that many of the functions inherent in these devices are explained in detail below. In terms of the components within network element 14, a MAG function is provided for deployment and device dependent network-based mobility support. A Foreign Agent (FA) can support client-based MIPv4. An RCEF is also provided, which can be integrated with the C-BGF for non-mobile data, where the deployment tied to NAT support in network element 14. Coupled to network element 14 is AAA server 26, which obtains user profile data. If the user is authorized for mobility, then a Proxy Mobile IP (PMIP) service can be invoked from the MAG (in the case of no local IP). Otherwise, the local IP address assignment can be from a Dynamic Host Configuration Protocol (DHCP) server or any other suitable function.

Also provided in the architecture of FIG. 1 is the integrated S7a, Rq, Ia, location and access interface, which offers an integrated policy control and charging interface for network element 14. This interface can be used to exchange location and access data for one or more end users. Resource and NAT control can be done using DIAMETER (or other suitable protocols), along with location and access network information. For PDN gateway 20, there could be an integrated C-BGF for mobility. PCRF 18 can be enhanced to relay location information, access network information, support NAT/NAPT-traversal, Rx+/Gq'-operations, etc. I-BGF 32 can reside between PDNs and alternatively be integrated with other elements within the architecture. For the S9 interface, there is policy peering to support NAT control, location-information, and access network information transfer.

In accordance with the techniques and teachings of example embodiments, the tendered system defines a converged and consolidated architecture that covers the requirements provided by both wireless and wireline access networks with further enhancements to cover femto-cells and Wi-Fi access. The Telecommunication and Internet converged Services and Protocols for Advanced Networking (TISPAN) is a body of the European Telecommunication Standards Institute (ETSI). In one example embodiment, the architecture is based on 3GPP Evolved Packet System and the ETSI TISPAN with various functional and interface enhancements.

In particular, the proffered architecture provides for a consolidated and enhanced policy infrastructure based on 3GPP Policy and Charging Control (PCC) and ETSI TISPAN, where the PCRF and SPDF functions can be merged and the Access Resource and Admission Control Function (A-RACF) function is kept in a single element (e.g., an edge router). Further policy enhancements involve universal support for location, access network information, and NAT control and definition of network element 14 to include the conditionally invoked evolved packet system (EPS) MAG function, as well as the TISPAN Connectivity Session Location and Repository Function (CLF) and the BGF functions.

Note that 3GPP (e.g., Release 8) defines the Evolved Packet System (EPS) as specified in TS 23.401, TS 23.402, TS 23.203, etc. The EPS consists of IP access networks and an Evolved Packet Core (EPC). Access networks may be 3GPP access networks, such a GERAN, UTRAN, and E-UTRAN (LTE) or they may be non-3GPP IP access networks such as eHRPD, DSL, Cable, or the Internet. Non-3GPP IP access networks can be divided into trusted and untrusted segments. Trusted IP access networks support mobility, policy, and AAA interfaces to the EPC, whereas untrusted do not. Instead, access from untrusted networks is done via the evolved Packet Data Gateway (ePDG), which provides for IPSec security associations to the user equipment over the untrusted IP access network. The ePDG in turn supports mobility, policy, and AAA interfaces to the EPC, similar to the trusted IP access networks.

The EPC provides several services of general use to IP access networks such as mobility, policy and charging control, authentication and authorization, accounting, lawful Intercept, secure access over untrusted network, etc. 3GPP does not specify any details with respect to the non-3GPP IP access networks and, in particular, 3GPP does not specify any details for wireline IP access networks. ETSI TISPAN has defined a next generation network (NGN) architecture for wireline networks, which addresses many of the same issues the 3GPP EPC is addressing, namely: policy and charging control, authentication and authorization, accounting, and lawful intercept. ETSI TISPAN does not address all the services and features provided by the EPC (e.g. mobility and secure access), but conversely, TISPAN defines a few services and features not covered by the EPC, namely: network address translation (NAT) traversal and location information.

As service providers increasingly move toward fixed-mobile convergence, it is desirable to have a single architecture and associated infrastructure defined that can support both wireless and wireline networks. To date, NGN architectures have focused on either the wireless or the wireline side. Although these NGN architectures generally allow both wireless and wireline networks to be supported, they tend to focus on the features required by the primary type of access network they are developed for and, hence, these NGN architectures do not provide a single comprehensive architecture that fully address both wireline and wireless networks.

An example embodiment provides a unified architecture with a common core infrastructure that supports both wireline and wireless access networks. This infrastructure includes addressing relevant wireline requirements in the wireless access network portion and relevant wireless requirements in the wireline access network portion. At a high level, the combined architecture provides a single converged policy and charging infrastructure, and a single AAA infrastructure for the wireline and the wireless access network. Mobility services are supported on the wireline side, location information is provided for both the wireline and wireless access networks, and NAT traversal functionality in the form of the ETSI TISPAN BGF functions are provided for the wireless networks as well. [Roaming aspects and peering interface enhancements are also considered and are further detailed below.] Part of the architecture combines functions and interfaces of the 3GPP wireless architecture with elements from the ETSI TISPAN wireline architecture to form a single consolidated architecture that service providers (having both wireline and wireless infrastructure) can use. The architecture provides a unified and single solution to the combined requirements from wireline and wireless.

Additionally, the enhanced architecture covers femto-cells and Wi-Fi access points and can potentially use the same interfaces and functional elements as provided by the combined wireless/wireline architecture. In addition, there can be a merger of the 3GPP Policy and Charging Control (PCC) architecture and the ETSI TISPAN policy model, whereby the 3GPP PCRF function incorporates the ETSI TISPAN Service Policy Decision Function (SPDF). The A-RACF function can be placed in an edge element (e.g., network element 14) to align the wireline access network policy infrastructure with the wireless access network. The admission control decision can be handled by the PDN gateway (in its capacity as a Policy and Charging Enforcement Function (PCEF)) for both the wireline and wireless mobility network services, by the serving gateway for the wireless network, by network element 14 for the wireline network, and/or other elements, but not necessarily the PCRF. This provides for a consistent and distributed policy management solution to all access networks in the architecture. An alternative solution would be to keep the A-RACF with the PCRF, however this may imply inconsistent behavior between the wireless and wireline networks from a PCC point of view.

In a general sense, the proffered architecture can offer an evolved broadband network gateway (eBNG) (e.g., network element 14), which includes a mobile access gateway that can be invoked conditionally so that only devices or services that actually need mobility services incur the associated cost and overhead of providing mobility services. Associated with this are:

a) Enhancements to both the 3GPP PCC and ETSI TISPAN policy model by universally providing location and access network information on all policy interfaces, and incorporating the TISPAN Connectivity Session Location and Repository Function (CLF) into the eBNG to enable this universal consolidation. This provides for distributed session state management in the wireline access network in a manner that is consistent with the wireless access network.

b) Enhancements to the 3GPP PCC architecture to include TISPAN Border Gateway Function (BGF) functionality, and an integrated and consolidated approach to enable BGF control for NAT traversal using the policy infrastructure for both wireless and wireline access.

In an example flow, network element 14 can receive packets for a communications flow from an end user, who can conduct the flow through a wireless network and a wireline network (network element 14 is used for the wireline network). The end user can elect either network option and yet have packets for the flow processed at a single location. More specifically, PDN Gateway 20 can provide IP communications with policy control for the end user at a single node in the network with network element 14 being used in the case of a wireline network. This can include policy-based resource control, which provides mediation between applications and the underlying network layer to intelligently manage network resources (e.g., dynamically and in real time). For operators, policy control is important for delivering a wide variety of high-value services with guaranteed quality of service across fixed, wireless, and cable access technologies. This policy control could further involve resource reservation requests (QoS and bandwidth reservations/allocations) to the appropriate gateway function for a session admission control decision based on defined policies for the subscriber and network resource limits. Then, based on the response received, resources can be assured and bandwidth guaranteed (e.g., on a per session basis).

Network element 14 can resolve admission control decisions for the end user in the wireline network. Subscriber specific policy decisions can be executed by the PCRF (or other elements in FIG. 1), where policy enforcement for the wireline network can be done by network element 14. This could include, for example, billing and quality of service (QoS) applications for the end user. Network element 14 can also provide access network information that indicates the type of access network being used by the end user. For example, if an end user is on a DSL connection, then it would be acceptable to allow the end user to download video, but this may not be the case with all access networks.

In terms of advantages, such a solution satisfies both the requirements from the wireless and the wireline side by having each side add the missing pieces to the other (e.g., NAT control for wireless and mobility for wireline). It also provides for consistent interfaces and operations to the elements in both the wireless and the wireline access network. Further, such a solution supports these consistent interfaces in both roaming and non-roaming scenarios: some of which are discussed in detail below with reference to FIGS. 2 and 3. The system also supports an efficient and scalable implementation of a converged wireline/wireless architecture by distributing key functions into network elements (and defining the concepts and associated interface enhancements, which support such a distribution).

In terms of some of the operational aspects of the proposed architecture, the following features are subsequently detailed: 1) session handling; 2) service insertion; 3) flexible service layer; 4) network address translation (NAT); 5) location information and network attachment sub-system (NASS) bundled authentication; and 6) charging. Turning first to session handling, access session AAA and address assignment can be handled by the AMF in conjunction with the NACF (e.g., the DHCP-server) and the UAAF (e.g., the AAA-Server) with corresponding enforcement functions for authorization data (e.g., the A-RACF and the RCEF). In one example, several access session types are supported (e.g., PPP, IP-Sessions, etc.). In addition, models such as PPP/L2TP model are enabled. The access session establishment also includes distribution of service layer access point/application manager (e.g., proxy-call session control function (P-CSCF) address). Note that the AMF, RCEF, A-RACF, and CLF could be supplied as a single physical device (potentially even including DHCP-Server (NACF)). The configuration could also be simplified to a new gateway function in the converged architecture (e.g., network element 14 of FIG. 1).

In one example, the BGF serves as an anchor point for service-layer (e.g., IMS) controlled services in the access/aggregation network. NAT can be used as "anchoring technology," where traffic to be controlled is directed/routed to the BGF, rather than tunneled to the BGF. In some implementations, not all traffic needs to go through the BGF (e.g., non-service-layer-controlled traffic, multicast traffic, traffic that does not require NAT-traversal operations, etc.). The BGF fulfills additional service layer functions (e.g., service-layer QoS, but is not necessarily involved in endpoint address assignment and authentication). At a concept level, the BGF and the PDN-gateway can fulfill similar roles in the network architecture, though individual functions could differ.

In regards to service insertion, multiple service insertion points can be driven by service economics (e.g., aggregation density, bandwidth, session counts, addressing requirements, traffic management (e.g. shaping) requirements, etc.). In such configurations, different PoPs/locations exist for different applications. Note that there is an evolution from one gateway to potentially multiple (i.e., not every packet is required to go through the same gateway). This can result in different service edges/service anchors. TISPAN allows for distributed service control points and even chained service control points, where there are multiple RCEFs and the RCEF placement is not restricted.

For the next mechanism, which is the flexible service layer feature, unicast and multicast is equally supported by TISPAN functional elements. The BTF is added in R2 to represent traffic forwarding and the interaction with policy enforcement (e.g., RCEF). TISPAN supports "push" and "pull" models for resource reservation and admission control. In terms of "push," the connection admission control (CAC) request is originated from the service layer (e.g., P-CSCF originated request during SIP call setup). For "pull," the CAC request is originated from the transport layer. The request could be originated from a network element within the network. The request could also be originated from the user equipment. There could also be combined models (service layer triggered transport signaling) in TISPAN. The SPDF is not necessarily involved in the pull-mode. For enhanced performance, co-location of the RCEF and the A-RACF on a single device is possible.

For the network address translation (NAT) mechanism, NAT on the customer premise equipment (CPE) (called the CNG in TISPAN) is often used in wireline deployments. The TE can be deployed behind a routed CNG, where local addressing of the TE is handled by the CNG. NAT traversal can (for example) use the application layer gateway (ALG) in the P-CSCF. The NAT could be incorporated into RCEF (i.e., the PCEF), when combined with the C-BGF. Note that S7 and S7a have been replaced by Gx and Gxa and, thus, can be thought of as interchangeable as used herein.

For location information and network attachment sub-system (NASS) bundled authentication (NBA), one objective is to support SIP-endpoints that do not necessarily support authentication (SIP-digest) and to provide location information for emergency calls. During registration or call-setup, the P-CSCF can query the access network to retrieve location information on the access session. The P-CSCF inserts the information into SIP P-A-N-I (P-Access-Network-Info) header. Information can be leveraged to skip authentication for the TE (at the SIP-level), or to provide location information in case of an emergency call.

Location information and event notification service can be offered via the e2 Interface to the CLF. The CLF represents a database of currently active access sessions: data typically available on a BNG. The CLF does not have an immediate counterpart in 3GPP. NASS services available at the e2 reference point can be provided to the AF and to the Customer Network Gateway Configuration Function (CNGCF).

For information query service, the AF can query the access network to receive information on the state of a particular access session. The AF can register to receive a particular event occurring within the access network (e.g., subscriber logs onto the access network). If a particular event occurs, the access network sends a notification message to all AFs, which registered to receive the event.

In certain embodiments, the subscriber has a bundled subscription for network access and application/IMS services (e.g., voice). In some instances, the user's handheld does not support IMS authentication procedures. A provider trusts the authentication/authorization of the access session. Once the access session is established, the user can register for application services as well, without additional authentication requirements. For simplicity reasons, the use-case assumes that the access provider trusts the physical line towards the subscriber (i.e., no explicit authentication used in the example). There can be two different user data repositories (AAA databases): one for the access user profile and one for the application user profile. The access provider trusts the physical line towards the subscriber (i.e., no explicit authentication used in the example). Addresses can be assigned using DHCP or other means.

Note that in many implementations, the HSS knows the current MME, SGSN, or AAA server, the serving gateway (for 3GPP access), and the PDN gateway. Also, the MME/SGSN knows the initial location information/cell-ID (upon attach or handover), the tracking area, the serving gateway, and PDN gateway. The PCRF knows the initial location information/cell-ID (upon attach or handover) (e.g., provided via S7). The AAA server knows the PDN gateway assigned and [potentially] the initial location information from non-3GPP IP access.

In terms of design choices, the AMF, A-RACF, RCEF, and CLF are typically co-located in a single physical platform. For a multi-edge wireline architecture, with multiple A-RACF (where the A-RACF function resides on the network elements), this allows for multiple gateways and, further, allows traffic to bypass the PDN gateway for sessions that do not need its services (i.e., add a direct link from a wireline access at network element 14 of FIG. 1 to the core network). The PCRF and SPDF functionality can also be merged such that the PCRF includes service policy management (network policies), at a single point of contact for policy and control of BGF functions. The subscriber specific application-aware policy decisions can be done by the PCRF.

In TISPAN, the user profile information can be handled by the A-RACF and not the SPDF. The PCRF function still includes user profile information, although network element 14 of FIG. 1 can contain the A-RACF functionality (static and application-unaware policies). Resource admission control can be supported in "push" and "pull" mode. "Pull" operations mainly involve A-RACF and RCEF for TISPAN. NAT support is added for both wireless and wireline cases.

In one example implementation, the BGF functional concept is a service gateway (service session anchor) and the C-BGF is a superset of the RCEF (i.e., RCEF plus NAT). The C-BGF and RCEF are integrated and are request dependent. For Mobility Services, the C-BGF can be used upstream of the mobility anchor (PDN gateway), where the C-BGF is configured on the PDN gateway as well. Alternatively, the C-BGF function can be kept separate. Also, a separate I-BGF function can be provided for inter-provider peering. Alternatively, the I-BGF function can be part of the PDN gateway. A single consolidated policy and NAT control interface can be used that is DIAMETER based, which enables optimized message flows when the BGF is integrated with the gateway(s). Note that with this flow, as with the others detailed herein, RADIUS, TACACS, and DIAMETER protocols can be implemented or substituted with other protocols that can achieve the intended communications.

Note that the TISPAN architecture differentiates devices in the home network. The CNG is usually fixed to an access network, where no mobility is assumed for the CNG. Example embodiments include terminal equipment that is assumed to be mobile. It is desired to do handover between different access networks (e.g., to provide seamless connectivity throughout a house, handover between a macro radio network and a WiFi access point in a house, etc.). A routed CNG typically does NAT operations and is generally represented by a single IP address in the access network. Multiple TEs can be "hidden" behind a single IP address. TE addressing can be subscriber controlled (e.g., where the CNG serves as a local DHCP server). One approach is to assume a bridged CNG/CPE for TEs that require mobility. Note that the CNG could be a hybrid (i.e., routed for some services, bridged for others). Alternatively, endpoint MIP support (host-based mobility) could be used.

In terms of the C-BGF and I-BGF functions, these represent packet-to-packet gateway elements (e.g., controlled by the SPDF; SPDF may be relaying AF instructions (from service layer)). These elements can also provide usage metering, allocation and translation of IP addresses and port numbers (network address port translation (NAPT)), and interworking between IPv4 and IPv6 networks (NAPT-PT). For the RCEF functions, these may include gate control (open/close gates), packet marking, resource allocation (per flow), policing of uplink/downlink traffic, and transcoding (optional). For C-BGF specific functions, these elements sit at boundaries between the access network and the core network and can offer hosted NAT traversal (latching).

For the I-BGF specific functions, these sit at a boundary between core networks and, further, may behave autonomously or under the control of the service layer (e.g., via RACS). The BGF functions can include packet marking, usage metering, and policing functions, which benefit from being provided by the I-BGF in the downlink direction, and the C-BGF in the uplink direction. Hosted NAT traversal can be provided by C-BGF. Functions that can be provided by either the C-BGF or the I-BGF include gate control, IPv4, and IPv6 interworking, transcoding (optional). While the home provider network can use BGF functions in the visited network (and ask the visited network to use them), the visited network could decide when to actually use these (and which C-BGF and I-BGF) for a flow (e.g., depending on where a flow originates and terminates (which networks)).

The CLF in the visited network (e.g., part of network element 14) could convey location information to the home network. The policy peering interface can be used for this. Peering can include the business relationship where ISPs reciprocally provide connectivity to each other's transit customers. The access network information can also easily be provided in this manner. Alternatively, the existing DIAMETER based e2 interface (TISPAN) can be used, however this could require an additional peering interface and infrastructure.

As noted earlier, network element 14 of FIG. 1 is enhanced to provide optional mobility and handover support. The MAG function can be added to this network element for network-based mobility (PMIPv6). Also, the MIPv4 foreign agent function is added to the network element for MIPv4 FA CoA operation. The client-based mobile IPv6 can be supported by IPv6 Home Agent (e.g., PDN gateway). The system can also acknowledge a multi-edge wireline architecture with multiple A-RACFs, where the A-RACF function can reside on network elements. The system can allow for multiple gateways and, further, allow traffic to bypass the PDN gateway (i.e., add a direct link from a wireline access network element to the core network) when mobility services are not needed. For network-based mobility, this can be invoked for devices (users) that subscribe to it (otherwise, allocate a non-mobile IP address on the network element). The BGF functionality can be enabled in the visited network to be used by the AF or policy function in the home network. In addition, policy peering can be extended with BGF control.

In terms of interfaces in the architecture, for the AF to PCRF interface, there is an Rx+Gq' harmonization. For policy peering (PCRF to PCRF), the S9 (Gx/Rx and Ri') interface is enhanced. For policy enforcement and delegation (PCRF to gateway), the S7 and S7a (Gx and Gxa) interface is enhanced. For location and access network information between the AF/P-CSCF and PCRF, the Rx+Gq' interface is enhanced.

The main additions to the Rx interface include binding information (NAT), latching indication (NAT), authorization lifetime support, IPTV package authorization, location Information transfer, and access network information transfer. In regards to the PCRF to PCRF [S9->S9+NAT+Location+Access], the S9 is an evolution of the Gx and/or Rx interface. There is a transfer of PCC information at the session level and the service data flow (SDF) level for the local breakout. There is also a transfer of QoS parameters and related packet filters for all other cases. There is also a transfer of control information. For the main additions to the S9 interface, there is NAT control (binding information and latching), transfer of location information, and transfer of access network information.

For the PCRF to PDN-gateway [S7->S7+NAT], the S7 interface is based on the Gx interface. There is also a transfer of PCC information at the session and SDF level and a transfer of access network and location information. The main additions to S7 include NAT control (binding information and latching). For the PCRF to the evolved broadband network gateway (eBNG) (e.g., network element 14), there is an S7a->S7a+NAT+events+location+access. The S7a/b/c interface is based on the Gx interface. There is also a transfer of QoS parameters and related packet filters and a transfer of control information. The additions may include a transfer of network access and location information, location information query/response, and event notification (for P-CSCF interaction optimization for NASS bundled authentication and compatibility with e2). Also included are binding information (NAT) and related addressing information and address latching (NAT).

For the PCRF to I-BGF exchanges, there is a new S7d reference point similar to the evolved S7 interface (PCRF-PDN gateway). This can be based on the Gx interface and there is a transfer of PCC information at the SDF level. Also provided is NAT control (binding information and latching). Contrary to S7 and S7a, there is no need for a transfer of access network and location information.

For AAA interactions [Ta* considerations], the Ta* connects the trusted non-3GPP IP access with the 3GPP AAA server/proxy and transports access authentication, authorization, mobility parameters and charging-related information in a secure manner. The Ta* resembles the TISPAN e5 (UAAF to UAAF) reference point from a functional point of view (AAA-proxy interface).

Typically, the PCRF may use the subscription information as a basis for the policy and charging control decisions. The subscription information may apply for both session-based and non-session based services. The PCRF can maintain session linking to the sessions where the assigned care of address (CoA) and user equipment (UE) identity (if available over Gxx) are equal. The AF can be an element offering applications that require dynamic policy and/or charging control. The AF can communicate with the PCRF to transfer dynamic session information. The AF may receive an indication that the service information is not accepted by the PCRF together with service information that the PCRF would accept. In that case, the AF can reject the service establishment towards the UE. If possible, the AF forwards the service information to the UE that the PCRF would accept.

An AF may communicate with multiple PCRFs. The AF can contact the appropriate PCRF based on either: 1) the end user IP address; and/or 2) a user equipment (UE) identity for which the AF is aware. In case of a private IP address being used for the end user, the AF may send additional PDN information (e.g., PDN ID) over the Rx interface. This PDN information can be used by the PCRF for session binding, and it can be used to help select the correct PCRF. For certain events related to policy control, the AF could be able to give instructions to the PCRF to act on its own. The AF may use bearer level information in the AF session signaling or adjust the bearer level event reporting. The AF may request the PCRF to report on the signaling path status for the AF session. The AF can cancel the request when the AF ceases handling the user.

Figure 2:
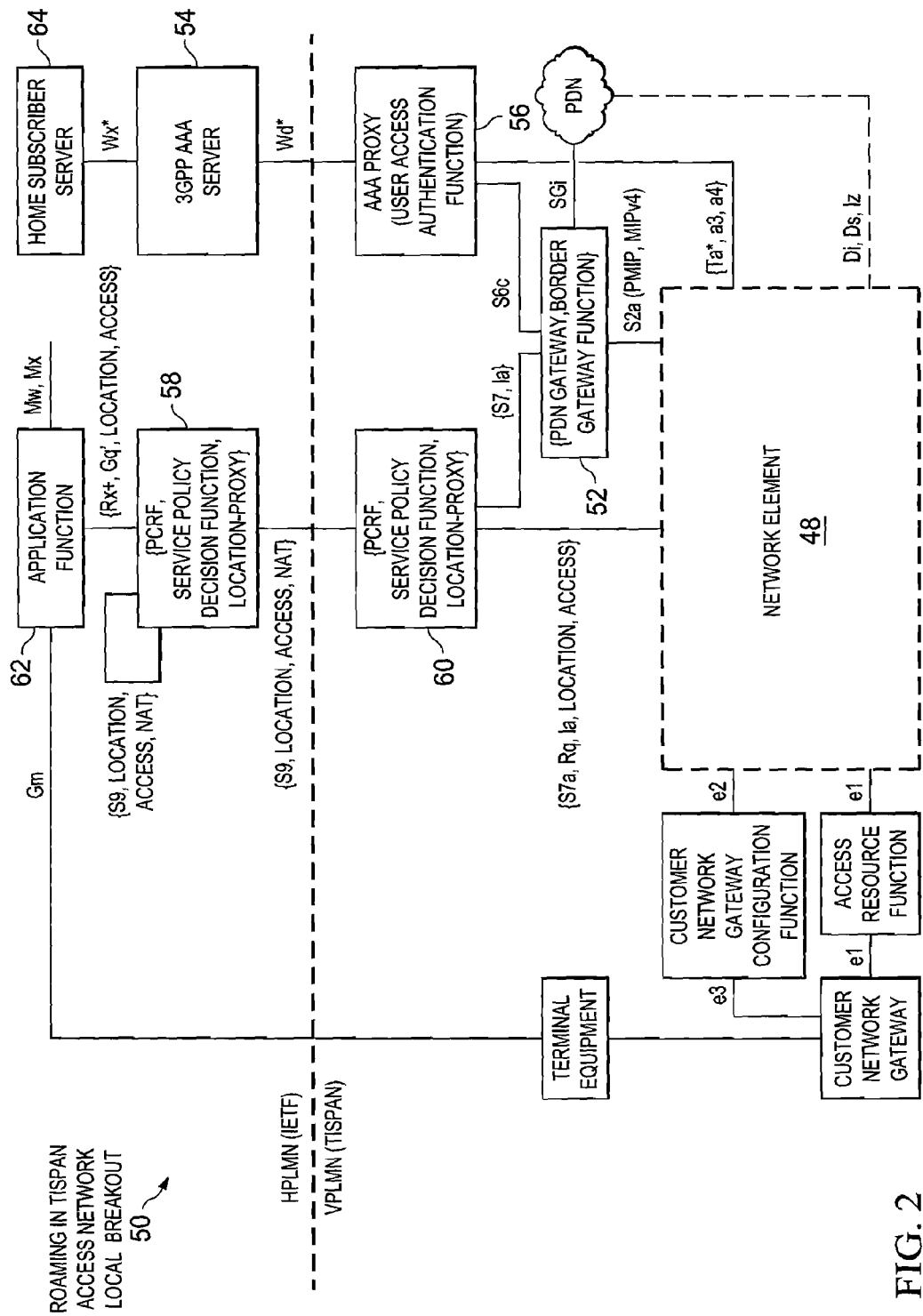
FIG. 2 is a simplified block diagram of an alternative example of the communication system, where roaming occurs in accordance with one embodiment of the present invention.
Figure 3:
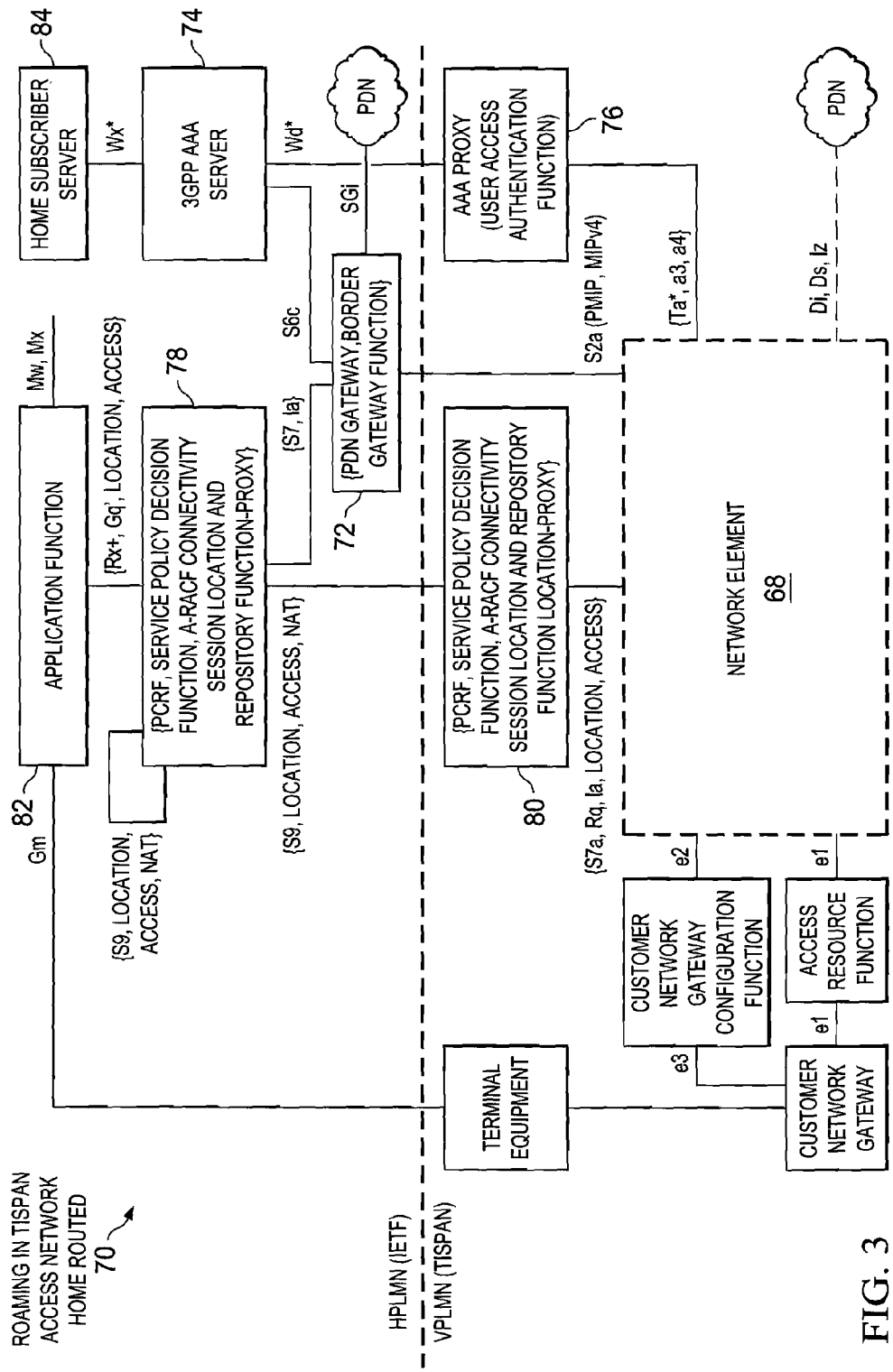
FIG. 3 is a simplified block diagram of another alternative example of the communication system, where roaming occurs in accordance with one embodiment of the present invention.

Both network element 14 and PCRF 18 are network elements that facilitate sessions and service flows between endpoints and a given network (e.g., for networks such as those illustrated in FIGS. 1-3). As used herein in this Specification, the term 'network element' is meant to encompass routers, switches, gateways, bridges, loadbalancers, firewalls, servers, or any other suitable device, component, element, or object operable to exchange information in a network environment. Moreover, these network elements may include any suitable hardware, software, components, modules, interfaces, or objects that facilitate the operations thereof. This may be inclusive of appropriate algorithms and communication protocols that allow for the effective exchange of data or information.

In one example implementation, network element 14 is an edge gateway that includes software for achieving some or all of the functionalities outlined herein. Network element 14 may include A-RACF and, further, provide the control and general processing mechanisms as outlined herein. The SPDF, which can reside in PCRF 18, can send instructions to network element 14 (C-BGF) for setting up the NAT traversal. The C-BGF informs the PCRF about the NAT binding to use and the PCRF can tell the AF about this activity. From an enforcement perspective, network element 14 can control those activities. In one example, PCRF 18 is a network element that includes software to achieve the control and general processing mechanisms outlined herein in this document. In other embodiments, this feature may be provided external to the network elements or included in some other network device to achieve these intended functionalities. Alternatively, both network element 14 and PCRF 18 include this software (or reciprocating software) that can coordinate in order to achieve the operations outlined herein. In still other embodiments, one or both of these devices may include any suitable algorithms, hardware, software, components, modules, interfaces, or objects that facilitate the operations thereof.

Each of these components (network element 14 and PCRF 18) can also include memory elements for storing information to be used in achieving the control and general processing mechanisms outlined herein. Additionally, each of these devices may include a processor that can execute software (e.g., logic) or an algorithm to perform the activities discussed in this Specification. These components may further keep information in any suitable memory element such as a random access memory (RAM), read only memory (ROM), erasable programmable ROM (EPROM), electronically erasable PROM (EEPROM), application specific integrated circuit (ASIC), software, hardware, or in any other suitable component, device, element, or object where appropriate and based on particular needs.

FIG. 2 is a simplified block diagram of an alternative example 50 of communication system 10, where roaming occurs in accordance with one embodiment. This example includes a local breakout for a Home Public Land Mobile Network (HPLMN) for 3GPP and a Visited Public Land Mobile Network (VPLMN) for TISPAN. The architecture further includes a network element 48, a PDN gateway 52, a 3GPP AAA server 54, an AAA Proxy (UAAF) 56, a set of PCRFs 58, 60, an AF 62, and an HSS 64. FIG. 3 is a simplified block diagram of another alternative example 70 of communication system 10, where roaming occurs in a home routed case for one embodiment. The architecture includes a network element 68, a PDN gateway 72, a 3GPP AAA server 74, an AAA Proxy (UAAF) 76, a set of PCRFs 78, 80, an AF 82, and an HSS 84. Note in this example, the PDN gateway has shifted its location.

Figure 4:
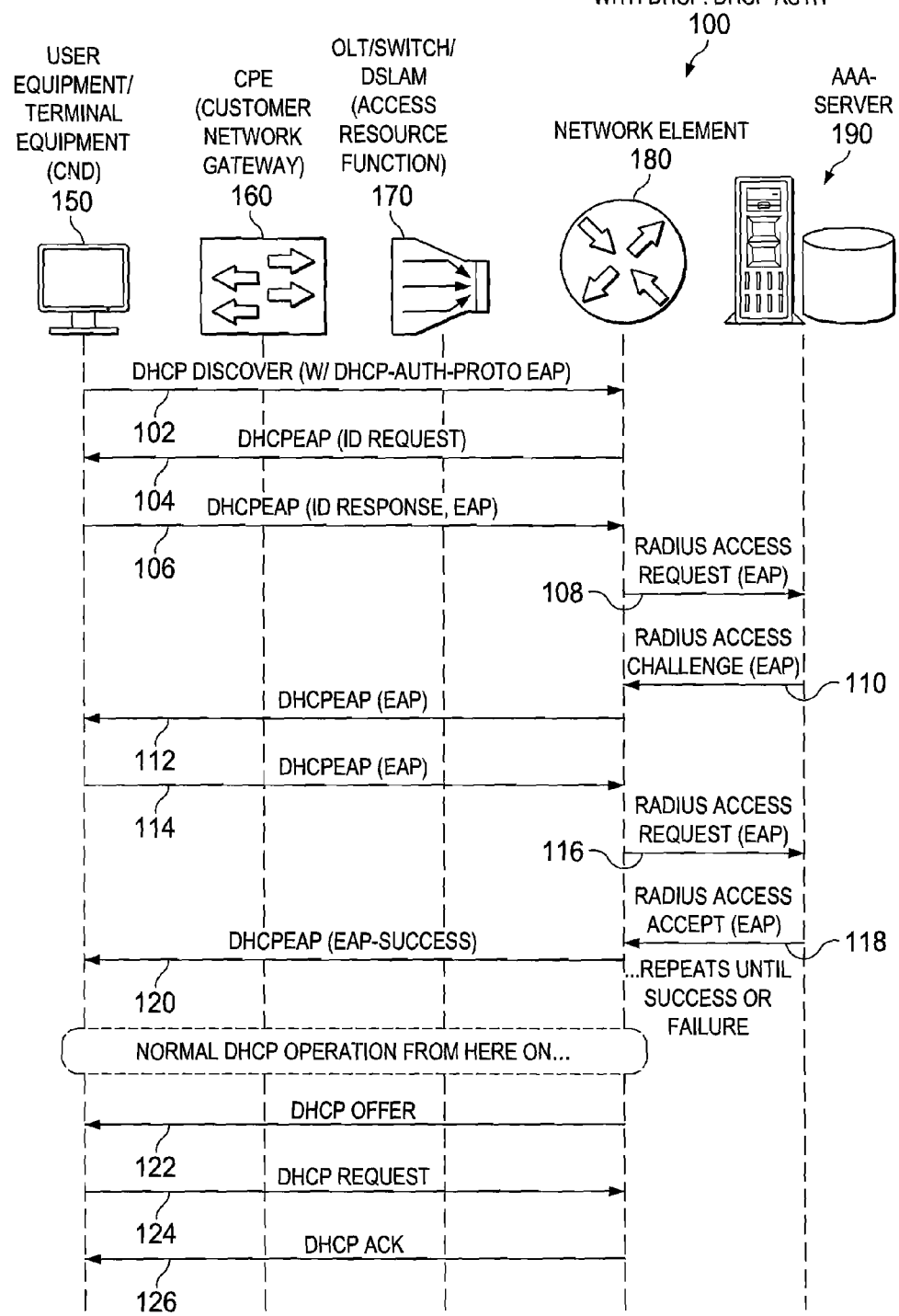
FIG. 4 is a simplified flowchart illustrating an example authentication flow in accordance with one embodiment of the present invention.

FIG. 4 is a simplified example flow 100 that highlights some of the operational aspects of the proffered architecture. On the 3GPP access side, nominal changes are made, and the focus of this flow is on the wireline segment of the configuration. Consider an example where an end-user initiates a flow and asks for an IP address. This could be in the form of a DHCP request. The authentication can be integrated with DHCP: DHCP-AUTH. Note that for many IP-sessions, DHCP is chosen over PPP because of multiple gateway support (PPP's nature of providing an integrated solution [transport, authentication, etc.] imposes too many restrictions on the architecture). Note that there is a desire to authenticate the end device prior to assigning an IP address. For DHCP-AUTH, a first alternative is based on an existing DHCP message set (it provides PPP such as authorization (PAP/CHAP)). For a second alternative, this supports advanced authentication types (e.g., extensible authentication protocol (EAP)) using an expanded DHCP message set.

Returning to the flow of FIG. 4, a number of components are illustrated and they include user equipment (UE)/terminal equipment (TE) 150, a customer premise equipment/customer network gateway (CNG) 160, an access relay function (ARF) element 170 [which could include a switch, DSLAM, etc.], a network element 180, and an AAA server 190. The flow begins at step 102, where a DHCP Discover message is sent from the terminal equipment to network element 180. At step 104, network element 180 returns an ID request to the user equipment. At step 106, the user equipment sends an ID response to network element 180. A number of RADIUS messages are subsequently exchanged at steps 108 and 110. EAP messages are then exchanged in subsequent steps (112 and 114). At steps 116 and 118, RADIUS messages are once again exchanged until there is a success or a failure. Upon EAP success, at step 120, network element 180 returns a response to the user equipment. From this point, normal DHCP operations would continue. At step 122, a DHCP offer is made from network element 180 to the user equipment. At step 124, there is a DHCP request that propagates to network element 180. Finally, at step 124. There is an acknowledged message sent back to the terminal equipment.

In regards to a selective network-based mobility invocation, one example embodiment involves defining network element 14 to include a mobile access gateway (MAG) function (e.g., as defined by PMIPv6). The network element could further include (or be coupled to) a foreign agent [FA]. In one example, the MAG is invoked selectively based on the device requesting an IP address, as opposed to unconditionally for all devices requesting an IP address. Devices that require the IP mobility services can therefore invoke the MAG, which in turn will interact with the PDN gateway (GW) in order to obtain an IP address for the device and, further, establish the IP mobility binding and tunneling with the PDN GW. Devices that do not require IP mobility services will not invoke the MAG and, hence, an IP address will be assigned locally on network element 14, where IP mobility overhead is avoided.

The decision as to whether IP mobility services are even needed can be performed in several different ways. For example, network element 14 may interact with an AAA infrastructure (or policy infrastructure) when the device (or user) requests an IP address, and the decision of whether mobility services are required can be based on the authorization data received back from the AAA server (or PCRF). Alternatively, the decision of whether mobility services are required can be based on identifiers derived from the access network (e.g., physical line-ID, NAS-port-ID, etc.). These could be received, for example, via DHCP-Option-82 or through a PPPoE tag. In still other examples, the device itself may indicate whether it requires mobility services. For example, if the device uses DHCP to obtain an IP address, then a DHCP option could be used to indicate whether IP mobility services are needed. If PPP is being used, then a PPP option may be used instead.

Other examples, where multiple service gateways are available to the access device over a single layer-2 access domain (e.g., one gateway supports IP-mobility services, while another gateway provides access to the local IPTV service network) and DHCP is used, the DHCP server could send down option-121 information as part of the IP address assignment procedure. This information identifies the IP address ranges, subnets, and next-hop IP gateways for each service to which that user has access. Hence, the access device could select the appropriate exit point/gateway using a routing decision and implicitly decide whether to use a mobility enabled service or not (i.e., using local breakout to access an IPTV service). Note that this scenario assumes that the address of the access device is assigned by the PDN GW, and address-ranges are partitioned as service specific.

The approaches outlined above can provide several advantages such as offering a more efficient use of overall network resources, which includes reduced overall usage of the IP mobility infrastructure by only invoking the MAG and PDN GW for devices that truly need and/or can use IP mobility. The architecture also offers less overall bandwidth usage by not routing packets to the PDN GW and by avoiding tunnel overhead between the MAG and PDN GW for devices that do not need IP mobility. It can also offer less delay for devices that do need IP mobility by avoiding routing to the PDN GW (which can serve as the Local Mobility Anchor [LMA]).

One assumption in example scenarios is that when the mobile device requests an IP address, it is actually provided by network element 14. This is not automatically the case. In particular, when a Network Address Translator (NAT) is deployed between user equipment and network element 14, then the IP address will be assigned by the NAT instead (e.g., customer network gateway), and network-based IP mobility services for that user equipment will not be invoked. In order to address this and still allow for efficient use of IPv4 addresses provided by the service provider, hybrid NATs could be used. A hybrid NAT can operate in routed mode for some devices and bridged mode for other devices. In routed mode, the NAT assigns a local IP address to the user equipment, whereas in bridged mode, the NAT allows the IP address to be assigned externally. The hybrid NAT can make this determination based on: 1) provisioned device information; and 2) a DHCP option, which informs the hybrid NAT of whether a local (routed mode) or remote (bridged mode) IP address could be assigned. The DHCP option used could be the same as that used by network element 14 to determine whether IP mobility services are needed.

An alternative solution to some of these challenges is to use an evolved Packet Data Gateway (ePDG) function. User equipment could establish an IPSec Security Association (possibly through a NAT) with the ePDG, and the ePDG would in turn invoke network-based mobility (PMIPv6) to the PDN GW. This could provide the IP mobility services for that particular user equipment. Such a solution would also work through NATs (provided IPSec is run on top of UDP) and, it would be an easy way to ensure that only devices that need mobility services would get them. In terms of the IPv4, UDP, IPSec ESP, IPv4, and payload issues, in one example implementation the following overhead is incurred: IPv4 header (20 bytes), UDP header (8 bytes), and IPSec ESP (12+ bytes) for each packet (40+ bytes).

Figure 5:
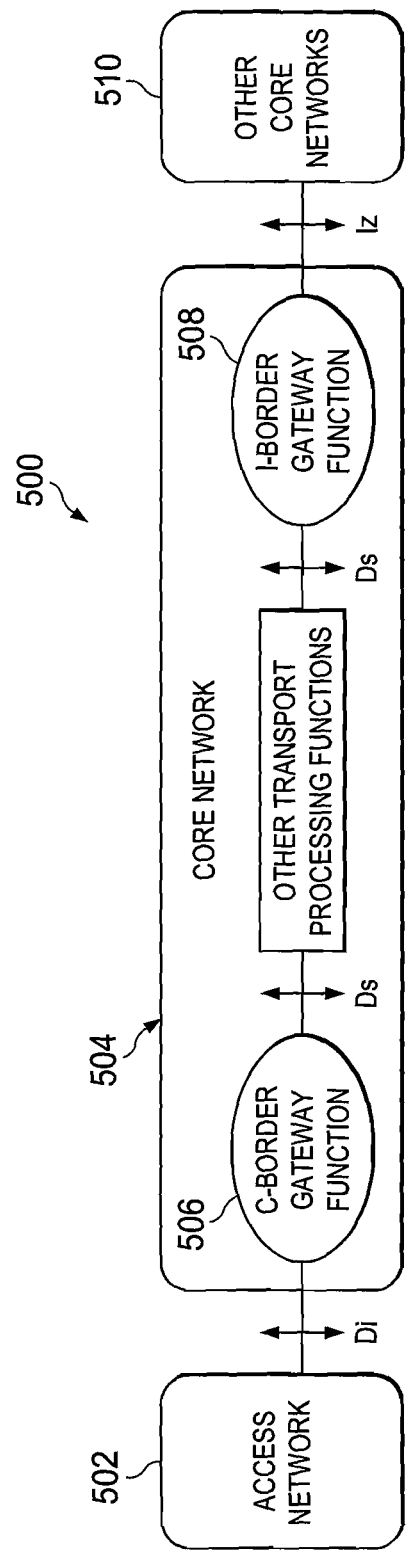
FIG. 5 is a simplified block diagram of an example implementation, which is illustrative of certain network functions.

FIG. 5 is a simplified block diagram of an example implementation 500, which is illustrative of certain BGF functions. FIG. 5 depicts an access network 502, a core network 504 (along with other core networks 510), where core network 504 includes a C-BGF 506 and an I-BGF 508. The C-BGF and I-BGF elements can function as a packet-to-packet gateway, which can be controlled by the PCRF/SPDF. The PCRF/SPDF may be relaying AF instructions (e.g., from a service layer). Other functions include usage metering for end users, along with allocation and translation activities for IP addresses and port numbers.

The RCEF functions can include gate control (open/close gates), packet marking, resource allocation (per flow), policing of uplink/downlink traffic, and transcoding (which may be optional). The C-BGF can sit at the boundary between the access network and the core network and perform hosted NAT Traversal (latching). The I-BGF can sit at a boundary between core networks and, further, it may behave autonomously or under the control of the service layer (via RACS).

Figure 6:
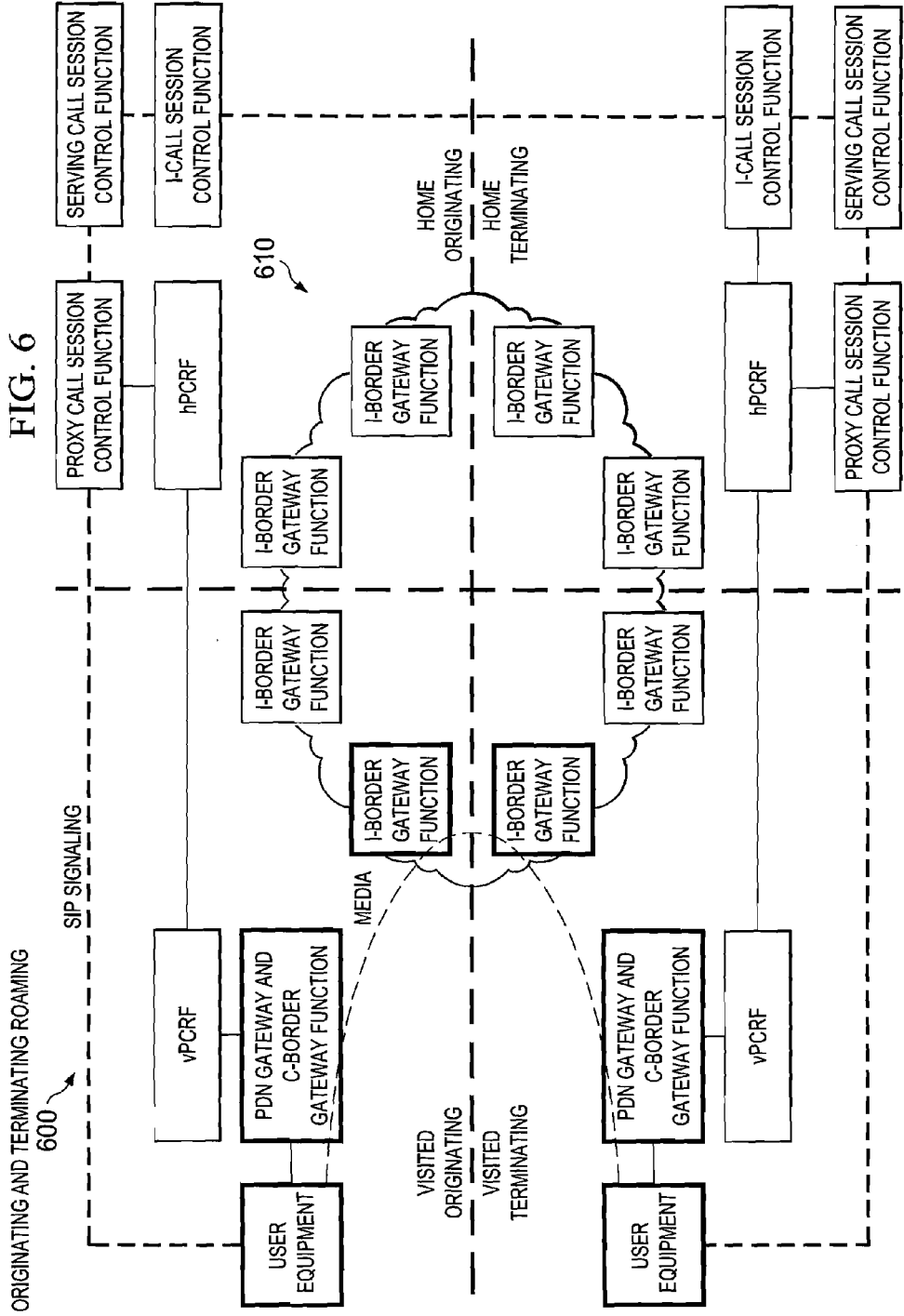
FIG. 6 is a simplified block diagram of an example implementation for an originating and terminating roaming scenario.
Figure 7:
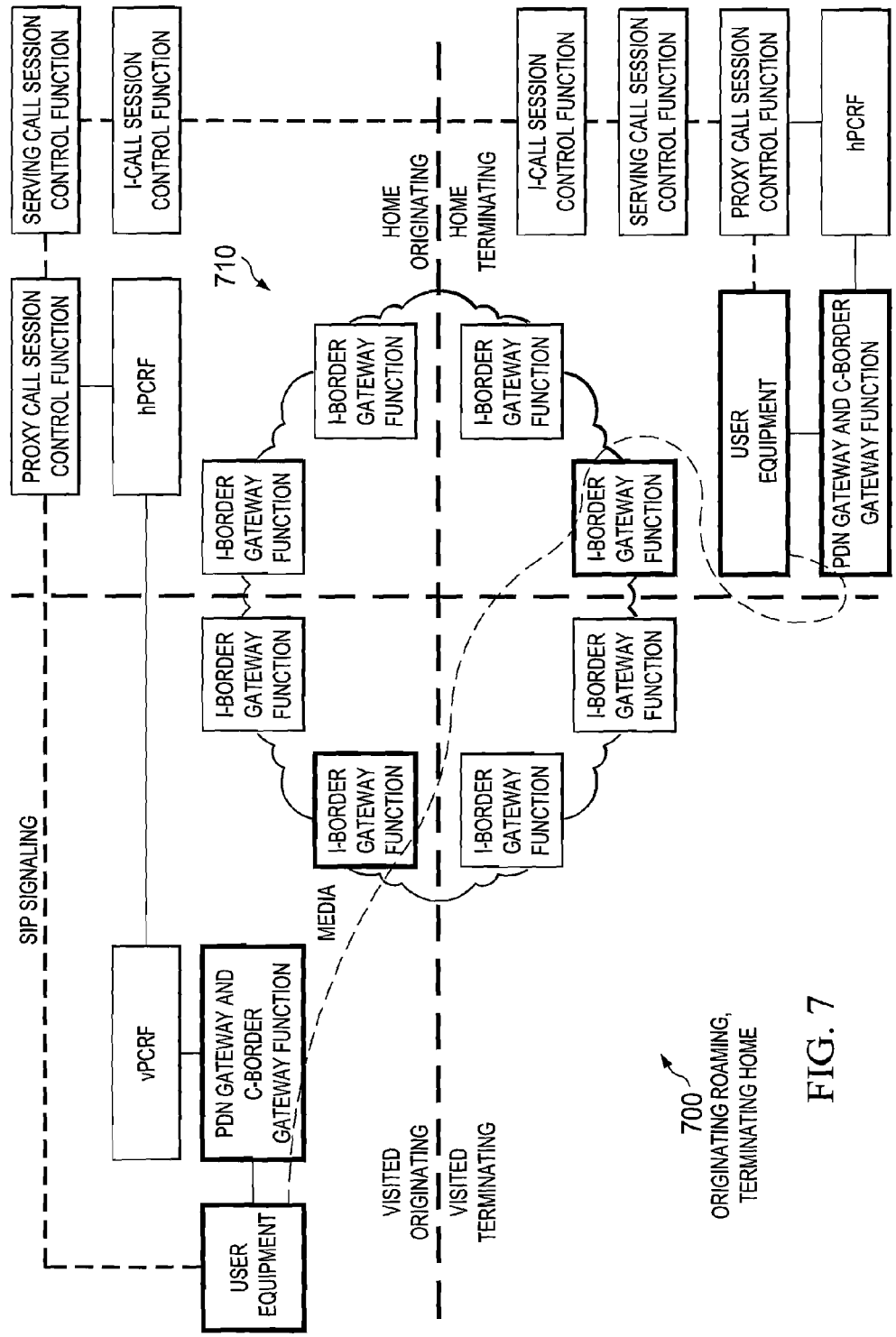
FIG. 7 is a simplified block diagram of an example implementation for an originating, roaming, and terminating home scenario.
Figure 8:
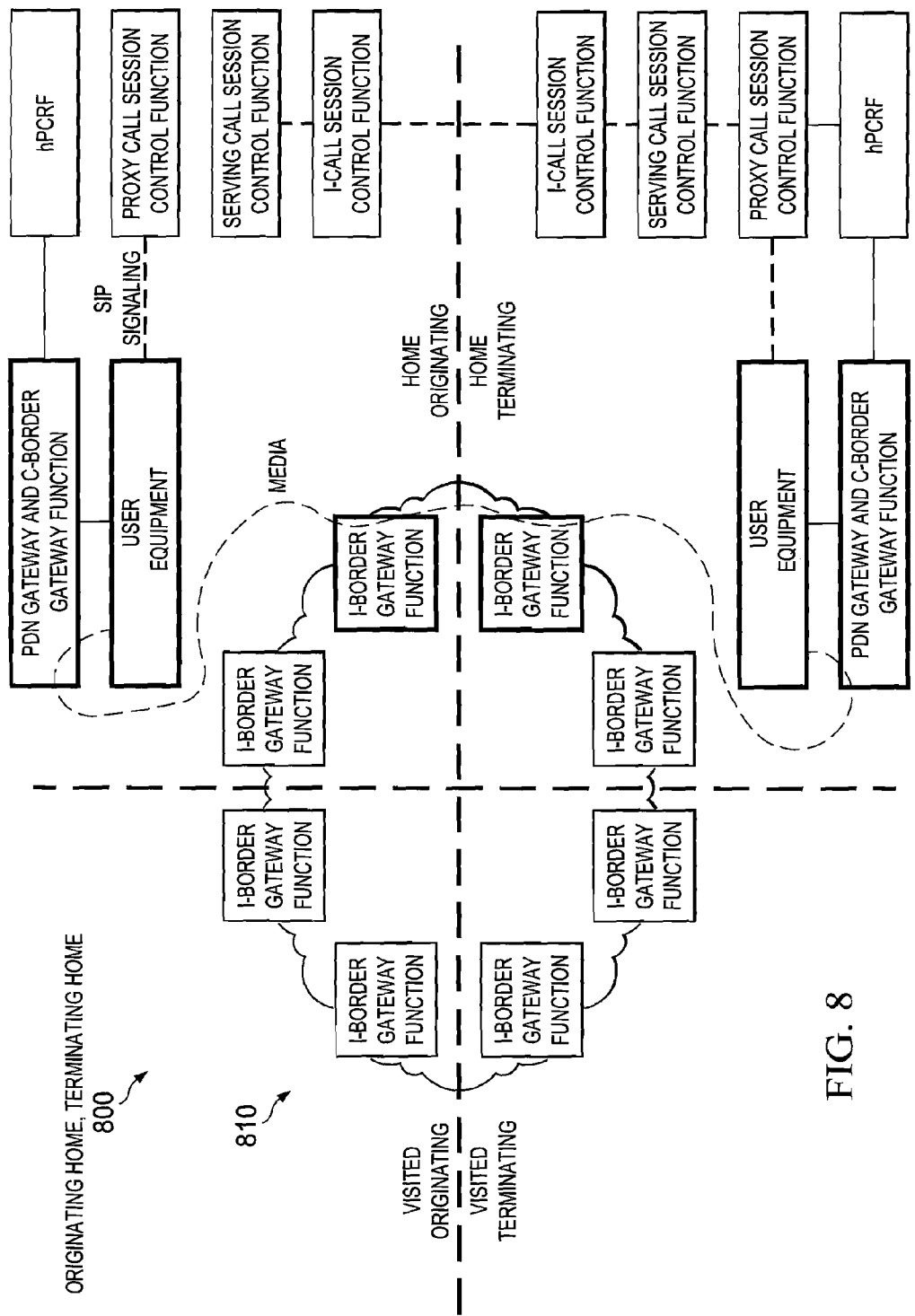
FIG. 8 is a simplified block diagram of an example implementation for an originating home, terminating home network scenario.
Figure 9:
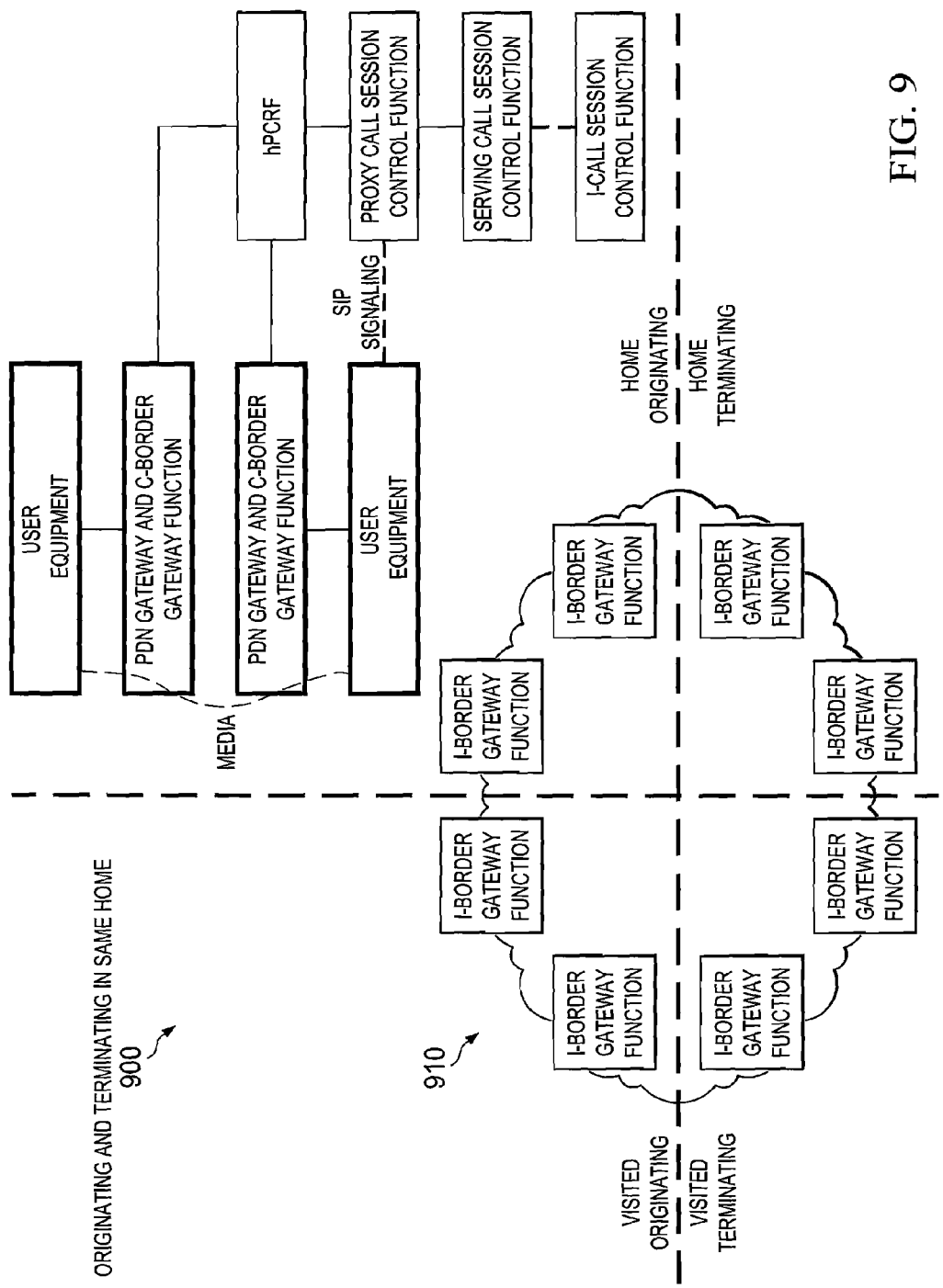
FIG. 9 is a simplified block diagram of an example implementation for an originating home, terminating home in the same home network scenario.

FIG. 6 is a simplified block diagram of an example implementation 600 for an originating and terminating roaming scenario. In this example, there is a network 610, which includes a number of I-BGF elements, which are located in the home or visited networks. As depicted in the illustrated pathway, the user equipment can access the PDN GWs and I-BGFs, as illustrated in the context of initiating and terminating a communication session. FIG. 7 is a simplified block diagram of an example implementation 700 for an originating, roaming, and terminating home scenario. In this example, there is a network 710, which includes a number of I-BGF elements, which are located in the home or visited networks. As depicted in the illustrated pathway, the user equipment can access the PDN GWs and I-BGFs, as illustrated in the context of initiating a communication session. FIG. 8 is a simplified block diagram of an example implementation 800 for an originating home, terminating home network scenario. In this example, there is a network 810, which includes a number of I-BGF elements, which are located in the home network. As depicted in the illustrated pathway, the user equipment can access the PDN GWs and I-BGFs, as illustrated in the context of initiating and terminating a communication session in the home network. FIG. 9 is a simplified block diagram of an example implementation 900 for an originating home, terminating home in the same home network scenario. In this example, there is a network 910, which includes a number of PDN GWs, which are located in the home network. A home PCRF (h-PCRF) is also illustrated in this example. As depicted in the illustrated pathway, the user equipment can access the PDN GWs and the h-PCRF, as illustrated in the context of initiating and terminating a communication session in the same home network.

Note that with the examples provided herein, interaction may be described in terms of two, three, four, or more network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of components, as well as more complicated or sophisticated arrangements and configurations. Accordingly, the examples provided should not limit the scope or inhibit the broad teachings of communication system 10 as potentially applied to a myriad of other architectures. Note also that the teachings discussed herein can readily be applied to wireless and femto access points and their respective environments.

It is also important to note that the steps described with reference to the preceding FIGURES illustrate only some of the possible scenarios that may be executed by, or within, communication system 10. Some of these steps may be deleted or removed where appropriate, or these steps may be modified or changed considerably without departing from the scope of the discussed concepts. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the discussed concepts.

Numerous other changes, substitutions, variations, alterations, and modifications may be ascertained to one skilled in the art and it can be intended that the discussed concept encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this invention in any way that is not otherwise reflected in the appended claims.

What is claimed is:

1. A method for reducing Internet Protocol (IP) mobility overhead, comprising:
   receiving option information from a Dynamic Host Configuration Protocol (DHCP) server as part of an IP address assignment procedure, the option information identifying IP address ranges, subnets, and next-hop IP gateways for each service to which a device has access;
   deciding whether IP mobility services are needed based on the option information;
   invoking IP mobility services in a wireline access network for the device requesting an IP address only if IP mobility services are needed;
   obtaining the IP address for the device based on the option information; and
   conducting a communication flow associated with the device between a wireless network and the wireline access network.

2. The method of claim 1, further comprising:
   communicating with a gateway to establish IP mobility binding and tunneling with the gateway only if IP mobility services are needed.

3. The method of claim 1, wherein deciding whether IP mobility services are needed further includes performing a decision via interaction with an Authentication, Authorization, and Accounting (AAA) element when the device requests the IP address.

4. The method of claim 1, wherein deciding whether IP mobility services are needed further includes performing a decision via interaction with a policy element when the device requests the IP address.

5. The method of claim 1, wherein deciding whether the IP mobility services are needed is further based on identifiers derived from an access network via Dynamic Host Configuration Protocol (DHCP) signaling.

6. The method of claim 1, wherein deciding whether the IP mobility services are needed is further based on a response delivered by the device, the response being associated with a DHCP option or a Point-to-Point Protocol (PPP) option.

7. An apparatus for reducing Internet Protocol (IP) mobility overhead, comprising:
   a memory for storing information; and
   a processor operable to execute instructions associated with the information;
   a mobile access gateway function that when executed by the at least one processor is configured to:
      receive option information from a Dynamic Host Configuration Protocol (DHCP) server as part of an IP address assignment procedure, the option information identifying IP address ranges, subnets, and next-hop IP gateways for each service to which a device has access;
      decide whether IP mobility services are needed based on the option information;
      invoke IP mobility services in a wireline access network for the device requesting an IP address only if IP mobility services are needed;
      obtaining the IP address for the device based on the option information; and
      conduct a communication flow associated with the device between a wireless network and the wireline access network.

8. The apparatus of claim 7, wherein the mobile access gateway function that when executed by the at least one processor is further configured to communicate with the gateway to establish IP mobility binding and tunneling with the gateway only if IP mobility services are needed.

9. The apparatus of claim 7, wherein deciding whether IP mobility services are needed further includes performing a decision via interaction with an Authentication, Authorization, and Accounting (AAA) element when the device requests the IP address.

10. The apparatus of claim 7, wherein deciding whether IP mobility services are needed further includes performing a decision via interaction with a policy element when the device requests the IP address.

11. The apparatus of claim 7, wherein deciding whether the IP mobility services are needed is further based on identifiers derived from an access network via Dynamic Host Configuration Protocol (DHCP) signaling.

12. The apparatus of claim 7, wherein deciding whether the IP mobility services are needed is further based on a response delivered by the device, the response being associated with a DHCP option or a Point-to-Point Protocol (PPP) option.

13. One or more non-transitory tangible media comprising logic for reducing Internet Protocol (IP) mobility overhead for execution and when executed by a processor operable to:
   receive option information from a Dynamic Host Configuration Protocol (DHCP) server as part of an IP address assignment procedure, the option information identifying IP address ranges, subnets, and next-hop IP gateways for each service to which a device has access;
   decide whether IP mobility services are needed based on the option information;
   invoke IP mobility services in a wireline access network for the device requesting an IP address only if IP mobility services are needed;
   obtaining the IP address for the device based on the option information; and
   conduct a communication flow associated with the device between a wireless network and the wireline access network.

14. The one or more non-transitory tangible media of claim 13, wherein the processor is further operable to:
   communicate with a gateway to establish IP mobility binding and tunneling with the gateway only if IP mobility services are needed.

15. The one or more non-transitory tangible media of claim 13, wherein deciding whether IP mobility services are needed further includes performing a decision via interaction with an Authentication, Authorization, and Accounting (AAA) element when the device requests the IP address.

16. The one or more non-transitory tangible media of claim 13, wherein deciding whether IP mobility services are needed further includes performing a decision via interaction with a policy element when the device requests the IP address.

17. A system for reducing Internet Protocol (IP) mobility overhead, comprising:
- means for receiving option information from a Dynamic Host Configuration Protocol (DHCP) server as part of an IP address assignment procedure, the option information identifying IP address ranges, subnets, and next-hop IP gateways for each service to which a device has access;
- means for deciding whether IP mobility services are needed based on the option information;
- means for invoking IP mobility services in a wireline access network for the device requesting an IP address only if IP mobility services are needed;
- means for obtaining the IP address for the device based on the option information; and
- means for conducting a communication flow associated with the device between a wireless network and the wireline access network.

18. The system of claim 17, wherein deciding whether IP mobility services are needed further includes performing a decision via interaction with an Authentication, Authorization, and Accounting (AAA) element when the device requests the IP address.

19. The system of claim 17, wherein deciding whether IP mobility services are needed further includes performing a decision via interaction with a policy element when the device requests the IP address.

20. The system of claim 17, wherein deciding whether the IP mobility services are needed is further based on identifiers derived from an access network via Dynamic Host Configuration Protocol (DHCP) signaling.

21. The system of claim 17, deciding whether the IP mobility services are needed is further based on a response delivered by the device, the response being associated with a DHCP option or a Point-to-Point Protocol (PPP) option.

* * * * *